(12) United States Patent
Nam et al.

(10) Patent No.: US 10,805,980 B2
(45) Date of Patent: Oct. 13, 2020

(54) DYNAMIC RECLAMATION OF RESOURCES RESERVED FOR FORWARD COMPATIBILITY

(71) Applicant: QUALCOMM Incorporated, San Diego, CA (US)

(72) Inventors: Wooseok Nam, San Diego, CA (US); Tao Luo, San Diego, CA (US); Sony Akkarakaran, Poway, CA (US); Makesh Pravin John Wilson, San Diego, CA (US); Sumeeth Nagaraja, San Diego, CA (US); Kaushik Chakraborty, San Diego, CA (US); Shengbo Chen, San Diego, CA (US); Xiao Feng Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 2 days.

(21) Appl. No.: 16/014,689

(22) Filed: Jun. 21, 2018

(65) Prior Publication Data
US 2019/0007994 A1    Jan. 3, 2019

Related U.S. Application Data

(60) Provisional application No. 62/527,016, filed on Jun. 29, 2017.

(51) Int. Cl.
*H04W 76/36* (2018.01)
*H04W 16/14* (2009.01)
(Continued)

(52) U.S. Cl.
CPC ........... *H04W 76/36* (2018.02); *H04L 5/0048* (2013.01); *H04W 16/14* (2013.01);
(Continued)

(58) Field of Classification Search
CPC . H04W 76/36; H04W 72/0486; H04W 16/14; H04W 72/042; H04W 76/27; H04L 5/0048
See application file for complete search history.

(56) References Cited

U.S. PATENT DOCUMENTS

2013/0163544 A1* 6/2013 Lee ................ H04W 72/04
                                                    370/329
2017/0359850 A1* 12/2017 Loehr ............. H04W 76/28

OTHER PUBLICATIONS

Ericsson: "Reserved resources supporting NR co-existence with LTE and Nb-IoT", 3GPP Draft; R1-1710912, 3rd Generation Partnership Project (3GPP), Mobile Competence Centre; 650, Route Des Lucioles; F-06921 Sophia-Cedex; France, vol. RAN WG1, No. Qingdao, China; Jun. 27, 2017-Jun. 30, 2017, Jun. 16, 2017 (Jun. 16, 2017), XP051304561, Retrieved from the Internet: URL: http://www.3gpp.org/ftp/tsg_ran/WG1_RL1/TSGR1_AH/NR_AH_1706/Docs/ [retrieved on—Jun. 16, 2017].

(Continued)

*Primary Examiner* — Walter J Divito
(74) *Attorney, Agent, or Firm* — Patterson & Sheridan, L.L.P.

(57) ABSTRACT

Certain aspects of the present disclosure relate to methods and apparatus for dynamic reclamation of resources reserved for forward compatibility using communications systems operating according to new radio (NR) technologies. Certain aspects provide a method for wireless communication. The method generally includes identifying resources previously reserved for forward compatibility (FC) that are available for reuse, and providing signaling, to one or more user equipments (UEs), indicating the identified resources are available for reuse.

29 Claims, 12 Drawing Sheets

(51) Int. Cl.
  *H04W 72/04* (2009.01)
  *H04W 76/27* (2018.01)
  *H04L 5/00* (2006.01)
(52) U.S. Cl.
  CPC ..... *H04W 72/042* (2013.01); *H04W 72/0486* (2013.01); *H04W 76/27* (2018.02)

(56) References Cited

OTHER PUBLICATIONS

International Search Report and Written Opinion—PCT/US2018/042313—ISA/EPO—Sep. 27, 2018.
Samsung: "Indication of Reserved Resources", 3GPP Draft; R1-1711455, Reserved Resource Final, 3rd Generation Partnership Project [3GPP), Mobile Competence Centre, 650, Route Des Lucioles, F-06921, Sophia-Antipolis Cedex, France, vol. RAN WG1, No. Qingdao, China; Jun. 27, 2017-Jun. 30, 2017, Jun. 16, 2017 (Jun. 16, 2017), XP051304630, 3 pages, Retrieved from the Internet: URL: http://www.3gpp.org/ftp/tsg_ran/WG1_RL1/TSGR1_AH/NR_AH_1706/Docs/ [retrieved on—Jun. 16, 2017].

* cited by examiner

DYNAMIC RECLAMATION OF RESOURCES RESERVED FOR FORWARD COMPATIBILITY

CLAIM OF PRIORITY UNDER 35 U.S.C. § 119

The present Application for Patent claims benefit of U.S. Provisional Patent Application Ser. No. 62/527,016, filed Jun. 29, 2017, assigned to the assignee hereof and hereby expressly incorporated by reference herein.

BACKGROUND

Field of the Disclosure

The present disclosure relates generally to communication systems, and more particularly, to methods and apparatus for dynamic reclamation of resources reserved for forward compatibility using communications systems operating according to new radio (NR) technologies.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a network entity. The method generally includes identifying resources previously reserved for forward compatibility (FC) that are available for reuse, and providing signaling, to one or more user equipments (UEs), indicating the identified resources are available for reuse Certain aspects provide a method for wireless communication by a user equipment (UE). The method generally includes receiving signaling identifying resources previously reserved for forward compatibility (FC) that are available for reuse, and communicating using the identified resources Aspects generally include methods, apparatus, systems, computer readable mediums, and processing systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
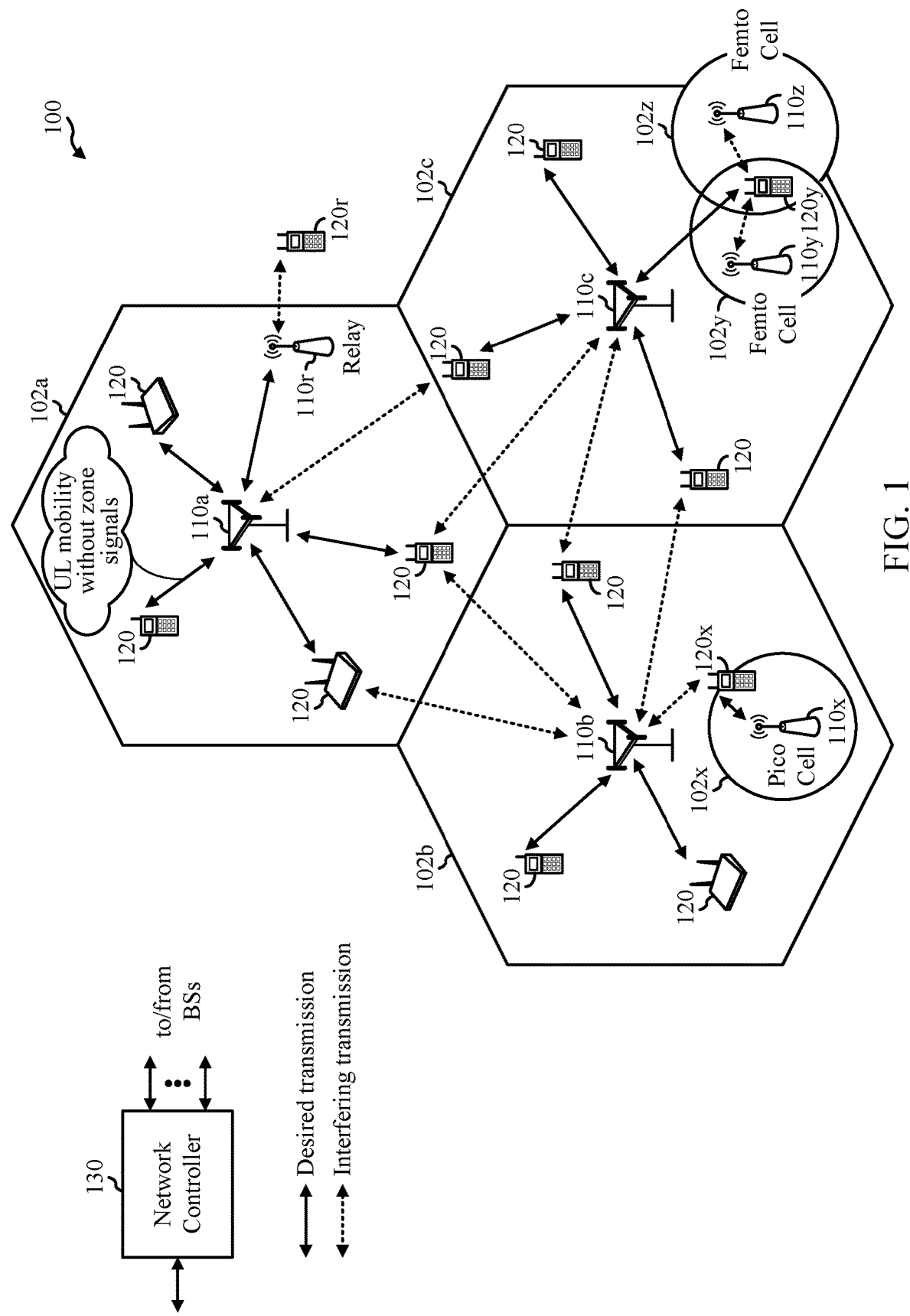
FIG. 1 is a block diagram conceptually illustrating an example telecommunications system, in which aspects of the present disclosure may be performed.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). New Radio (NR) (e.g., 5G radio access) is an example of an emerging telecommunication standard. NR is a set of enhancements to the LTE mobile standard promulgated by 3GPP. "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BS for the femto cells 102*y* and 102*z*, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
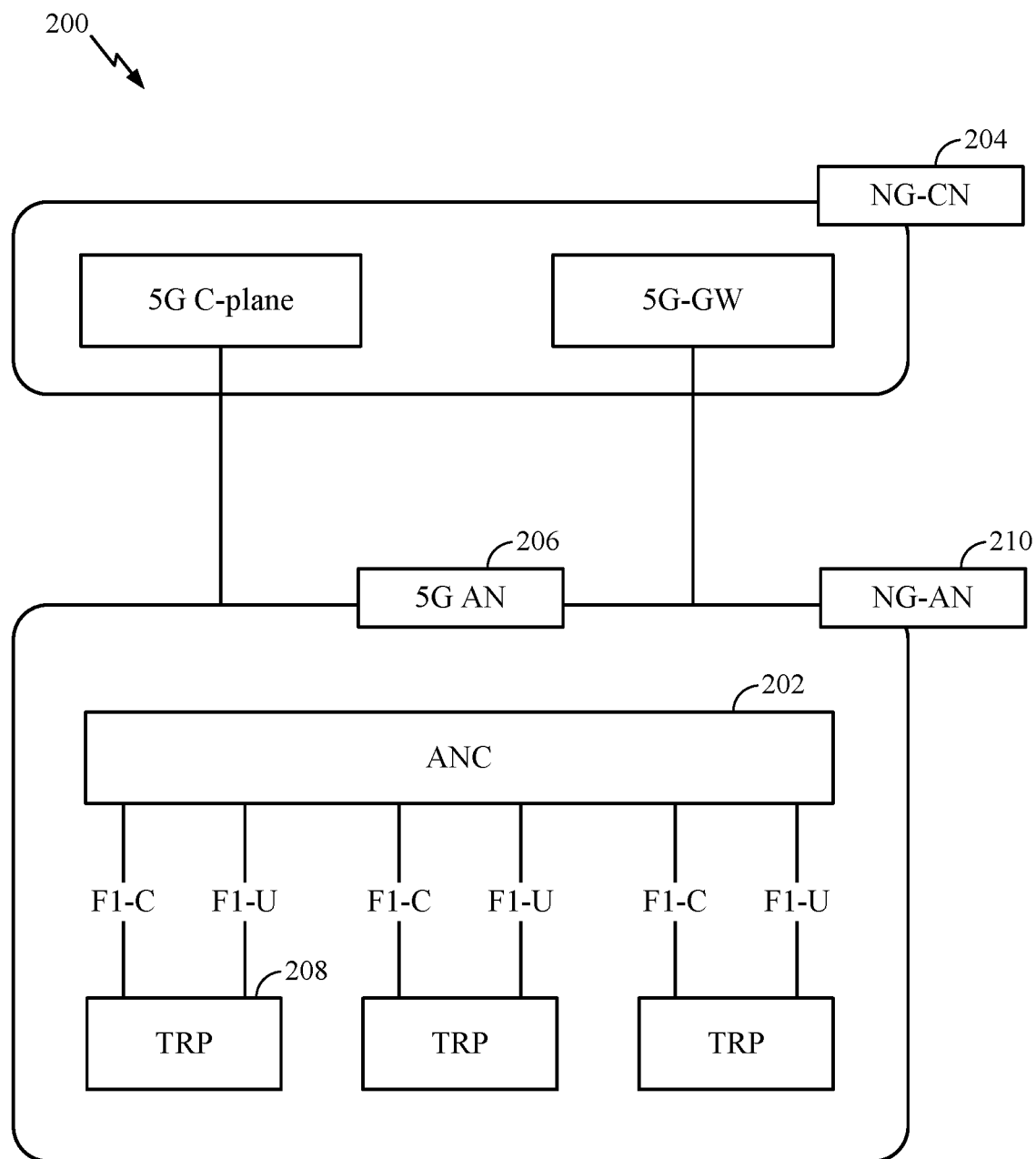
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
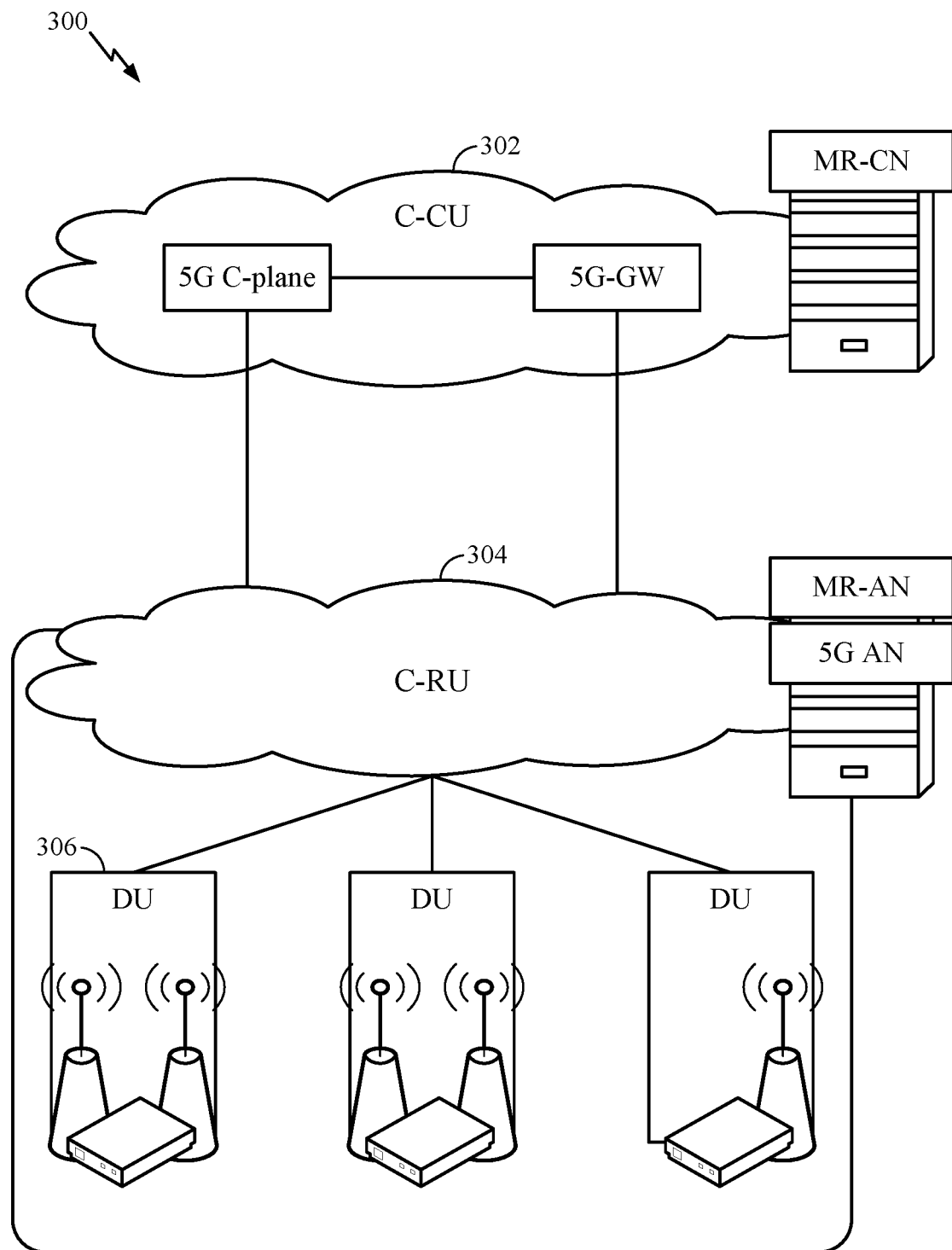
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
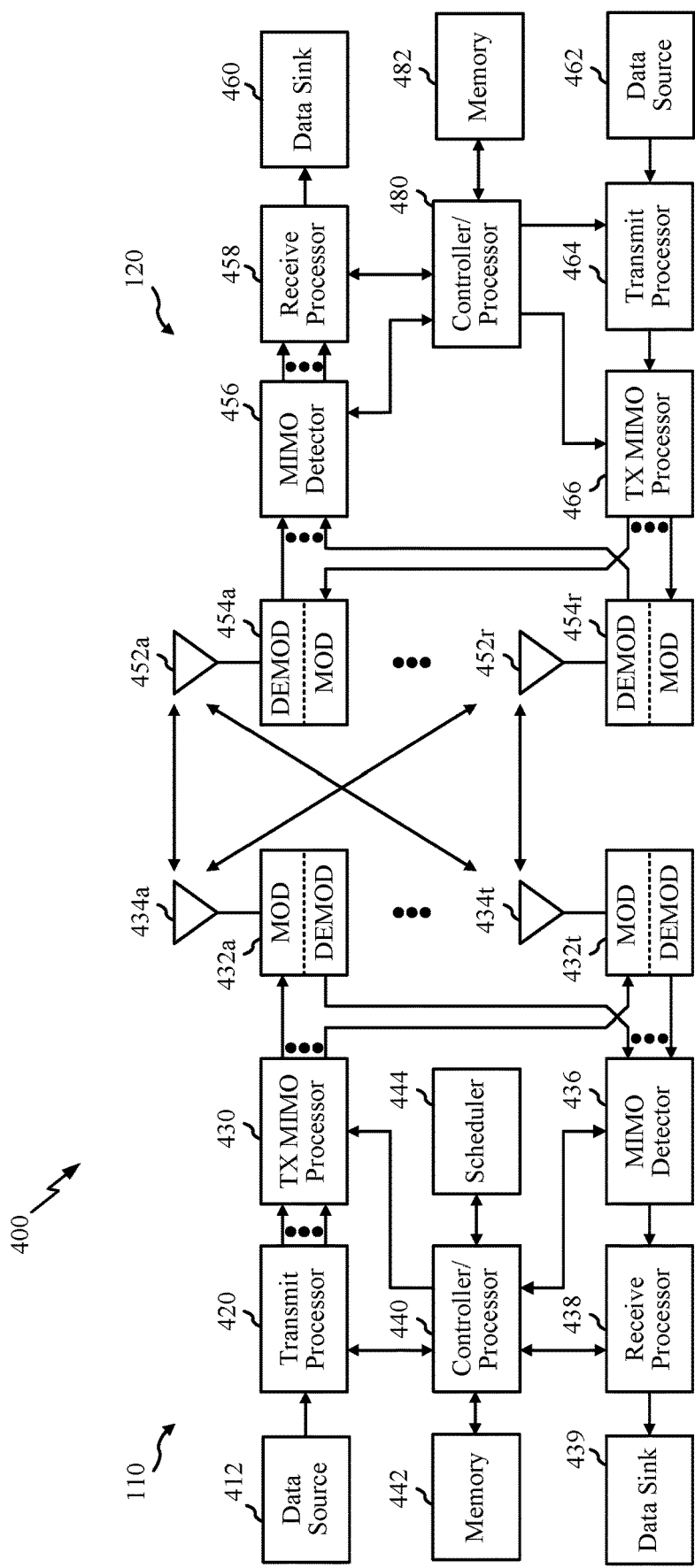
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, MOD/DEMOD 454, processors 466, 458, 464, and/or controller/processor 480 of the UE 120 and/or antennas 434, MOD/DEMOD 432, processors 430, 420, 438, and/or controller/processor 440 of the BS 110 may be used to perform the operations described herein and illustrated with reference to FIGS. 7 and 8.

FIG. 4 shows a block diagram of a design of a BS 110 and a UE 120, which may be one of the BSs and one of the UEs in FIG. 1. For a restricted association scenario, the base station 110 may be the macro BS 110*c* in FIG. 1, and the UE 120 may be the UE 120*y*. The base station 110 may also be a base station of some other type. The base station 110 may be equipped with antennas 434*a* through 434*t*, and the UE 120 may be equipped with antennas 452*a* through 452*r*.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (Tx) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. For example, the Tx MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
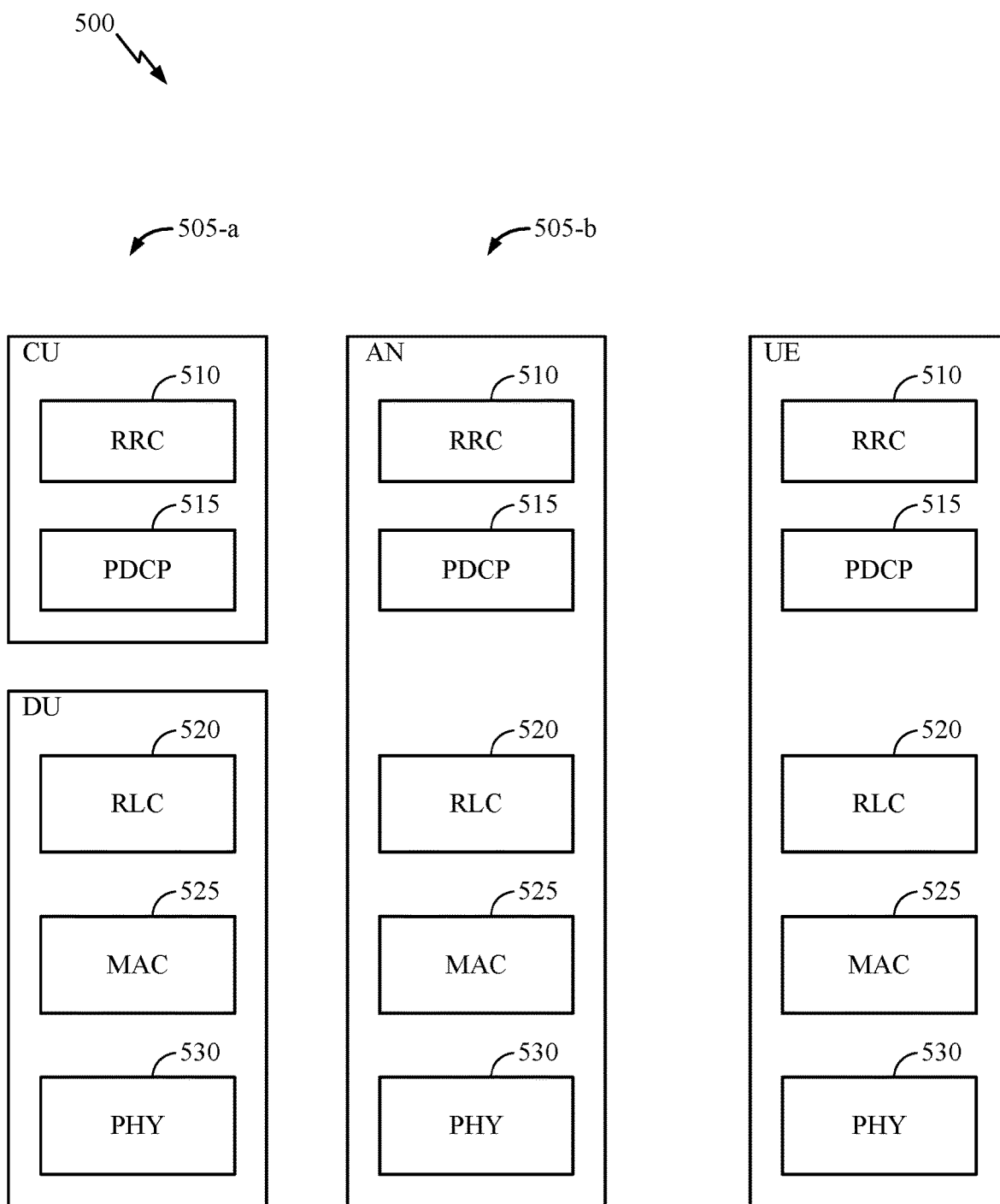
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
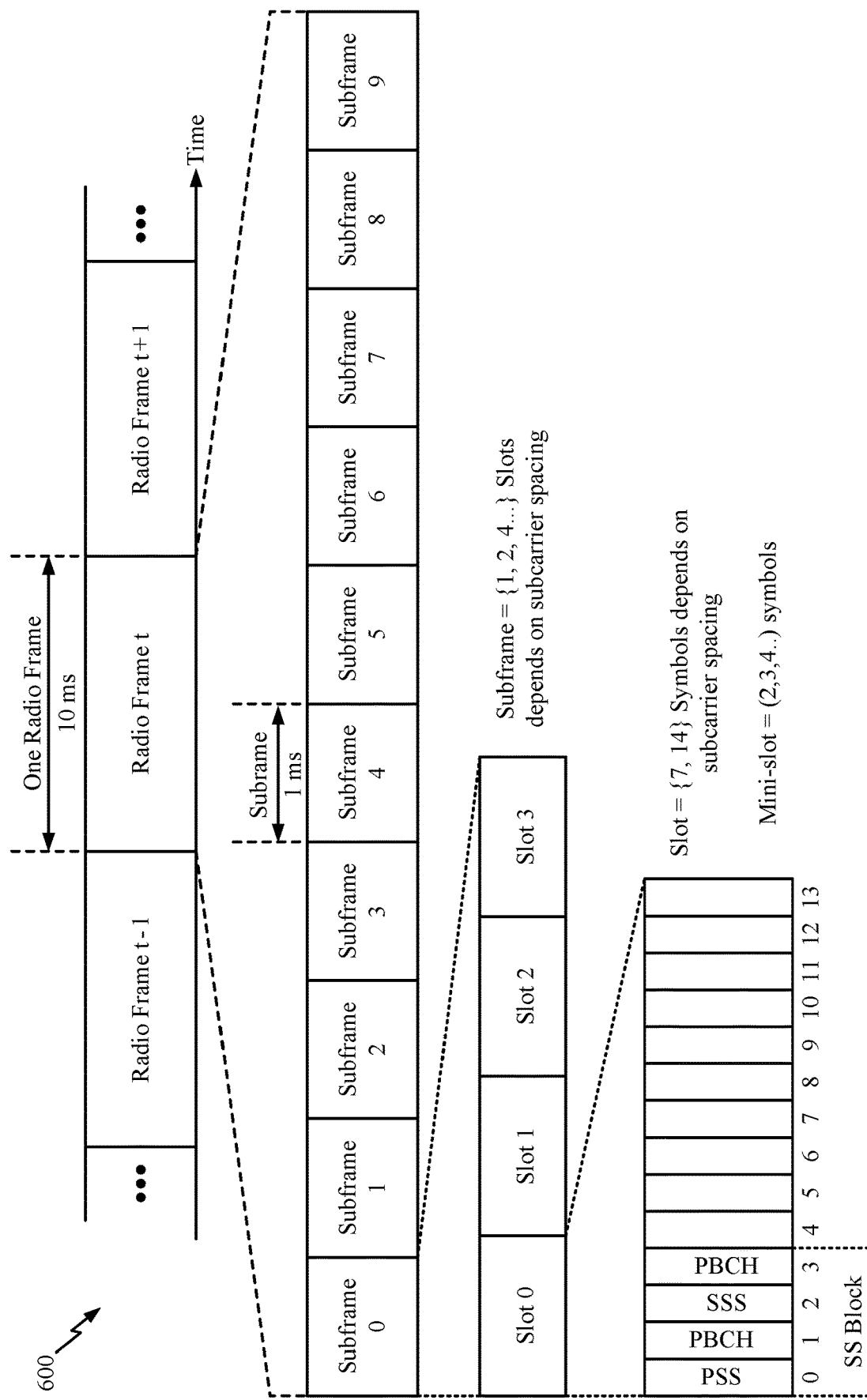
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 4, or 7 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example of Forward Compatibility

A forward compatible design for NR may be provided that can ensure a smooth introduction of future services, features, spectrum, and new types of devices. Further, a forward compatible design for NR may be provided that can ensure and maintain access to earlier services and UEs in the same spectrum.

A forward compatible design for NR may include some resources that are referred to as forward compatible resources that may need to be reserved for forward compatible operations. For example, some control or data resources can be reserved as forward compatible resources. A specific case of control data resources that can be reserved may include some symbols or sub-bands of a control and/or data region. Another example may include a control or data payload such as some bit fields in the payload. In another example, sounding and sensing resources may be reserved as forward compatible resources, for example, RS (e.g. CSI-RS), IMR, etc.

In one or more examples, forward compatible (FC) resources may be configured and indicated to UEs by using broadcast messages such as system information. In other examples, forward compatible (FC) resources may be configured and indicated to UEs by using unicast messages such as RRC signaling for connected mode UEs.

Currently, FC resources are statically or semi-statically assigned, and therefore, cannot be used by legacy services and/or legacy devices such as cells, TRPs, and/or UEs. Accordingly, legacy control/data transmissions are rate matched around the FC resources. Although the impact of this may be minimized by design, (semi-)static assignment of FC resources may diminish the flexibility and efficiency of the entire system. This may be especially true when the system is mostly populated with legacy devices (cells/TRPs/UEs).

Example of Dynamic Reclamation of Resources Reserved for Forward Compatibility In accordance with one or more aspects of embodiments described herein, dynamic reclamation and/or reconfiguration of resources reserved for forward compatibility is provided. Further, one or more cases may allow any services or cells/TRPs/UEs to reuse the reserved FC resources in a dynamic manner. Therefore, in accordance with one or more cases, with some specific conditions, the FC resources may be dynamically reconfigured to be used by any services or cells/TRPs/UEs (including legacy services/devices) for different purposes.

Figure 7:
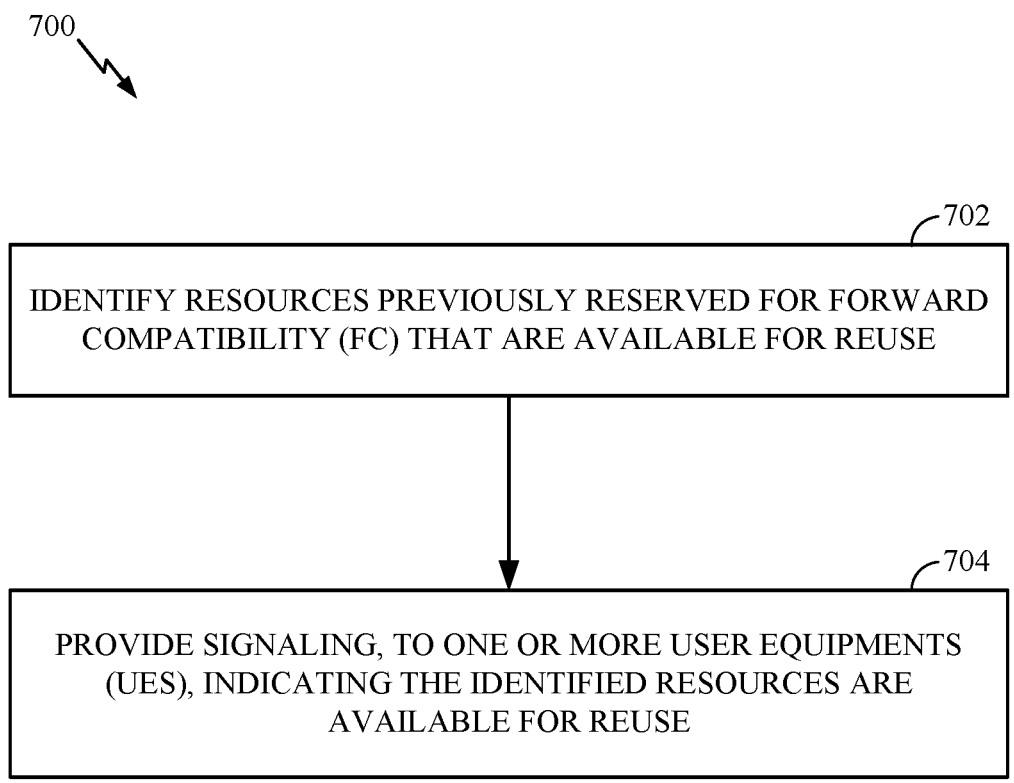
FIG. 7 illustrates example operations for wireless communications by a network entity, in accordance with aspects of the present disclosure.

FIG. 7 illustrates operations 700 for wireless communications that may be performed by a network entity, in accordance with aspects of the present disclosure.

Operations 700 begin, at 702, with the network entity identifying resources previously reserved for forward compatibility (FC) that are available for reuse. At 704, the operation 700 may further include the network entity providing signaling, to one or more user equipments (UEs), indicating the identified resources are available for reuse.

In some cases, the resources are identified as available based on one or more triggering events. In some cases, the one or more triggering events comprise a triggering event based on at least one of location of one or more UEs, non-overlapping spatial sectors, application-specific requirements, orcapabilities of one or more UEs. In some cases, the one or more triggering events comprise a triggering event based on actual usage of the FC resources. The operations 700 may further include the network entity determining actual usage of the FC resources based on at least one of sensing of loading of the FC resources, sensing of traffic on the FC resources, or backhaul signaling of at least one of loading or traffic on the FC resources.

Figure 8:
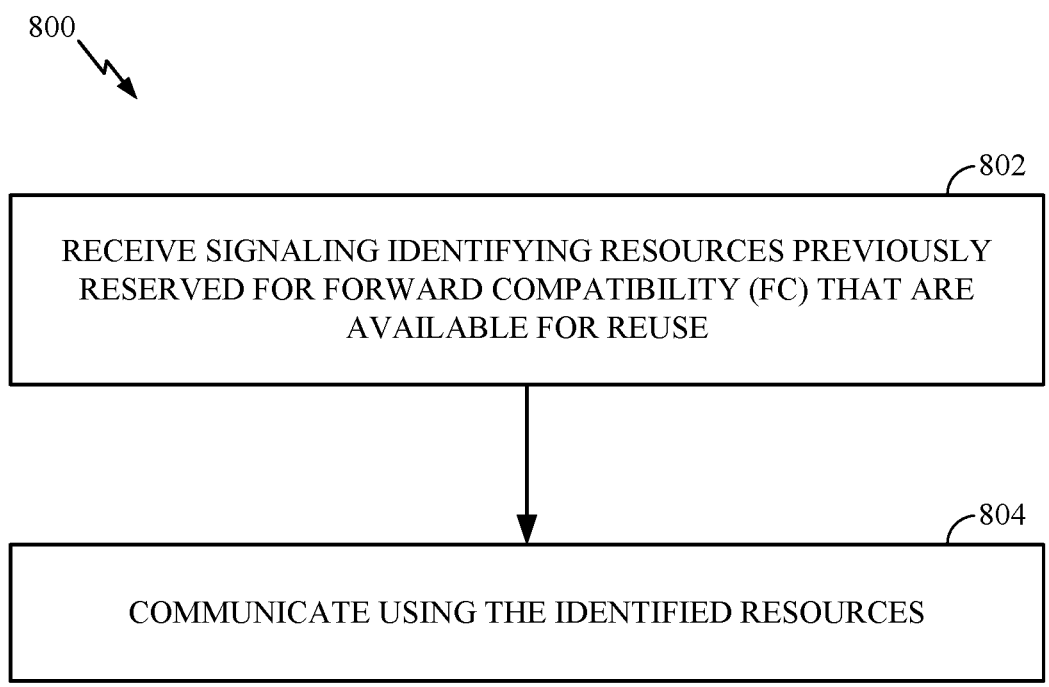
FIG. 8 illustrates example operations for wireless communications by a user equipment (UE), in accordance with aspects of the present disclosure.

FIG. 8 illustrates operations 800 for wireless communications that may be performed by a user equipment (UE), in accordance with aspects of the present disclosure.

Operations 800 begin, at 802, with the UE receiving signaling identifying resources previously reserved for forward compatibility (FC) that are available for reuse. At 804, the operations 800 may further include the UE communicating using the identified resources.

According to one or more cases, dynamic reconfiguration of FC resources may be provided that allow any services or cells/TRPs/UEs to reuse the reserved FC resources in a dynamic manner. Particularly, in accordance with one or more cases, the static reservation of FC resources may be maintained. However, when some specific conditions are provided, the FC resources can be dynamically reclaimed to be used by any services or cells/TRPs/UEs including legacy services and/or devices for different purposes.

Dynamically reclaiming the FC resources may be provided on a per-slot basis. In other cases, the FC resources may be reclaimed for symbol-wise reuse and/or sub-band reuse. Further, dynamically reclaiming the FC resources may be provided for some time duration. In one or more cases, dynamically reclaiming the FC resources may be provided based on some pattern, for example, a periodicity of reuse, a hopping pattern, etc. Further, another example of dynamically reclaiming the FC resources may be based on spatial beamforming.

Indication of reclaimed resources may be a cell-specific, UE-specific, or UE-group-specific indication of resource allocation, and may be based on MAC-CE and/or downlink control information (DCI) or (group-common) DCI-alone signaling. The indication, by MAC-CE and/or DCI or DCI-alone signaling, has higher priority over RRC-signaling and/or broadcasting-based assignment of FC resources. Accordingly, in one or more cases, for example, the time duration may be triggered by a DCI.

In one or more cases, maintaining multiple FC resource configurations may be provided. Multiple FC resource configurations may be established by RRC signaling or broadcast messages. In some cases, an index of configuration in use may be signaled by MAC-CE and/or group common DCI. A set of FC resource configuration may comprise one or more of a full FC resource configuration, a reduced FC resource configuration, and/or an empty FC resource configuration. In some cases, for example, the time duration may be a part of a FC resource configuration.

One of these full, reduced, and/or empty FC resource configurations may be dynamically selected depending on the load condition of FC resources. For example, selection of 'Full FC resources' may indicate the inclusion of operations including, for example, disabling any reclamation of FC resources because the FC resources are fully utilized and therefore none can be used. Selection of 'Empty FC resources' may indicate that all FC resources can be reused for other purpose because no one is using the resources so anyone can use the resources for another purpose.

According to some cases, one or more conditions for activating dynamic reclamation may be provided. In one or more cases, UE locations (e.g. cell edge or center) and/or interference characteristics can be considered conditions for activating dynamic reclamation. In one or more cases, an interference characteristic may usually depend on a UE location.

In some cases, FC resources for neighboring cells may be reused by cell-center UEs, because the FC resources produce less inter-cell interference. In another example, FC resources may be reused between UEs in neighboring cells in non-overlapping (or minimally overlapping) spatial sectors.

Application-specific requirements may serve to provide conditions for activating dynamic reclamation. In some cases, some urgent service may override the FC resources of its serving cell. Further, prevention of using FC resources to reduce co-channel interference can also be supported. UE capabilities may also serve as conditions for activating dynamic reclamation. In some cases, some advanced receivers with interference mitigation capabilities may reuse the FC resources.

Actual usage of FC resources may indicate conditions for activating dynamic reclamation. Accordingly, the load/traffic of FC resources can be monitored by gNBs/TRPs/UEs and reused in a cognitive manner. The load/traffic of FC resources can be sensed at gNBs/TRPs/UEs, similar to a listen-before-talk framework for shared spectrum systems. Further, backhaul or network signaling can also deliver the load/traffic information.

Figure 9:
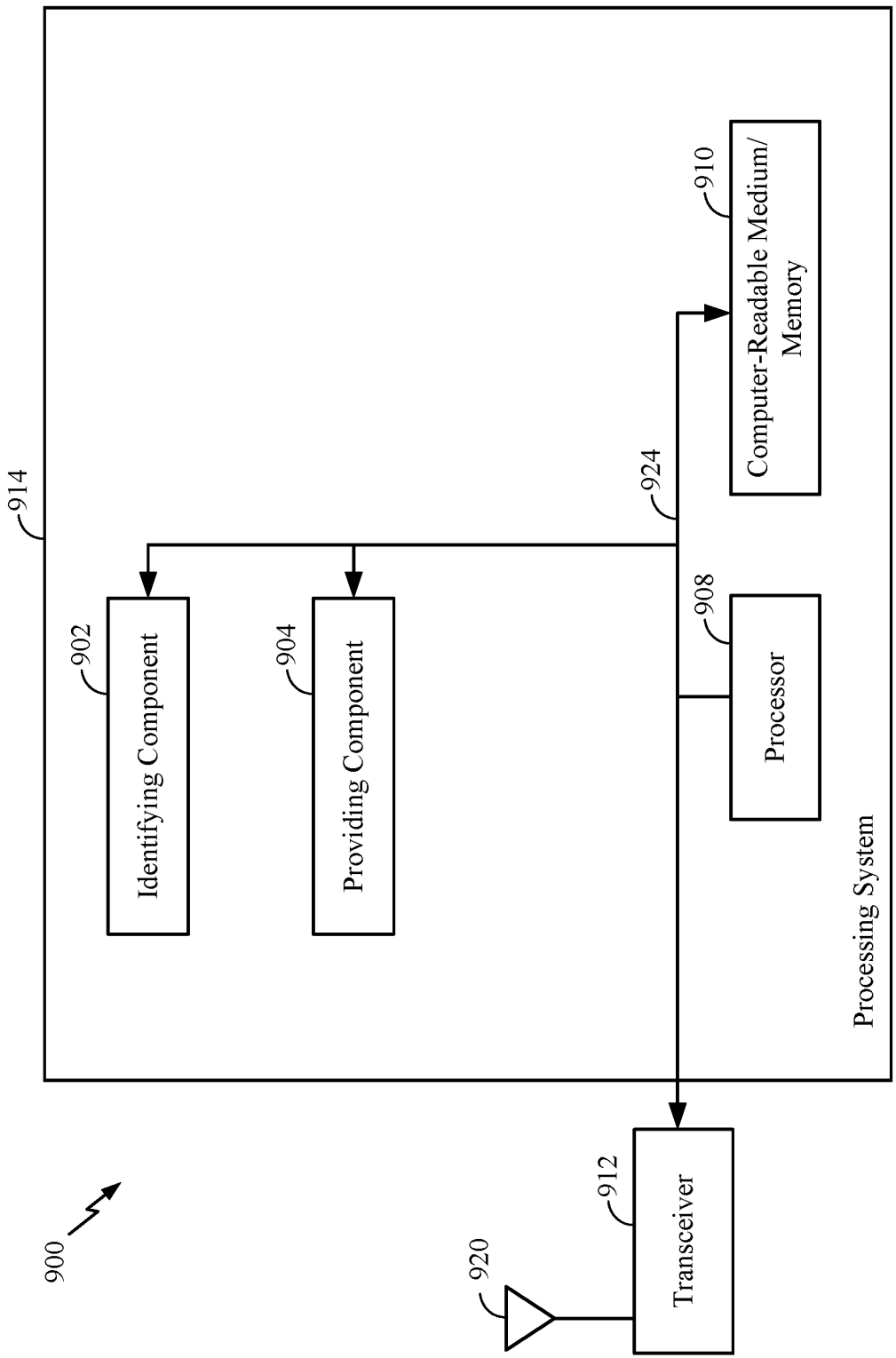
FIG. 9 illustrates a communications device that may include various components configured to perform operations for the techniques described herein in accordance with aspects of the present disclosure.

FIG. 9 illustrates a communications device 900 that may include various components (e.g., corresponding to means-plus-function components) configured to perform operations for the techniques described herein, such as the operations 700 illustrated in FIG. 7. The communications device 900 includes a processing system 914 coupled to a transceiver 912. The transceiver 912 is configured to transmit and receive signals for the communications device 900 via an antenna 920, such as the various signal described herein. The processing system 914 may be configured to perform processing functions for the communications device 900, including processing signals received and/or to be transmitted by the communications device 900.

The processing system 914 includes a processor 908 coupled to a computer-readable medium/memory 910 via a bus 924. In certain aspects, the computer-readable medium/memory 910 is configured to store instructions that when executed by processor 908, cause the processor 908 to perform the operations illustrated in FIG. 7, or other operations for performing the various techniques discussed herein. In certain aspects, the processing system 914 further includes an identifying component 902 for performing the operations illustrated at 702 in FIG. 7. The processing system 914 also includes a providing component 904 for performing the operations illustrated at 704 in FIG. 7.

The identifying component 902 and providing component 904 may be coupled to the processor 908 via bus 1024. In certain aspects, the identifying component 902 and providing component 904 may be hardware circuits. In certain aspects, the identifying component 902 and providing component 904 may be software components that are executed and run on processor 908.

Figure 10:
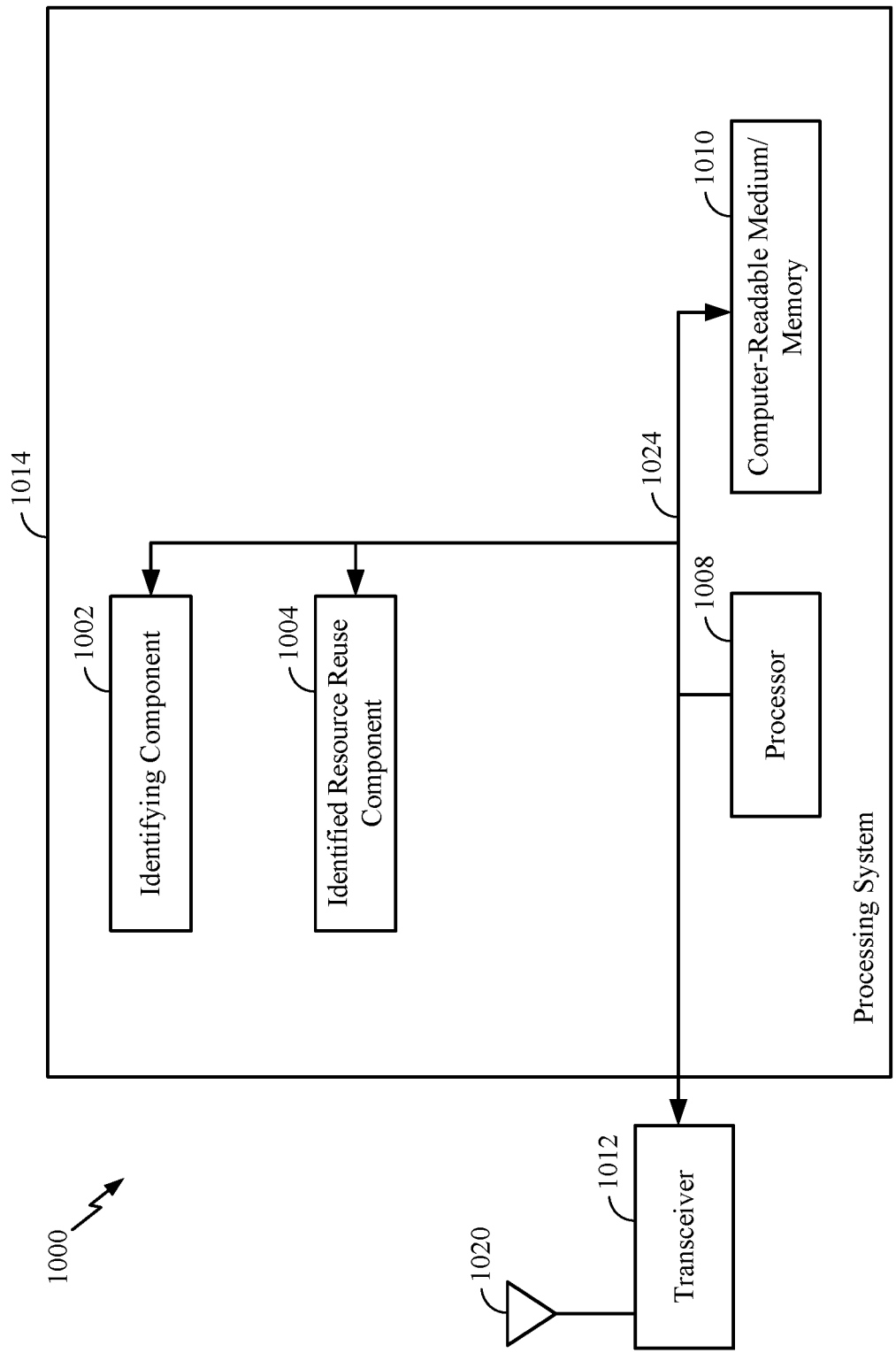
FIG. 10 illustrates a communications device that may include various components configured to perform operations for the techniques described herein in accordance with aspects of the present disclosure.

FIG. 10 illustrates a communications device 1000 that may include various components (e.g., corresponding to means-plus-function components) configured to perform operations for the techniques described herein, such as the operations 800 illustrated in FIG. 8. The communications device 1000 includes a processing system 1014 coupled to a transceiver 1012. The transceiver 1012 is configured to transmit and receive signals for the communications device 1000 via an antenna 1020, such as the various signal described herein. The processing system 1014 may be configured to perform processing functions for the communications device 1000, including processing signals received and/or to be transmitted by the communications device 1000.

The processing system 1014 includes a processor 1008 coupled to a computer-readable medium/memory 1010 via a bus 1024. In certain aspects, the computer-readable medium/memory 1010 is configured to store instructions that when executed by processor 1008, cause the processor 1008 to perform the operations illustrated in FIG. 8, or other operations for performing the various techniques discussed herein. In certain aspects, the processing system 1014 further includes an identifying component 1002 for performing the operations illustrated at 802 in FIG. 8. The processing system 1014 also includes an identified resource reuse component 1004 for performing the operations illustrated at 804 in FIG. 8.

The identifying component 1002 and identified resource reuse component 1004 may be coupled to the processor 1008 via bus 1024. In certain aspects, the identifying component 1002 and identified resource reuse component 1004 may be hardware circuits. In certain aspects, the identifying component 1002 and identified resource reuse component 1004 may be software components that are executed and run on processor 1008.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing described herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Figure 7A:
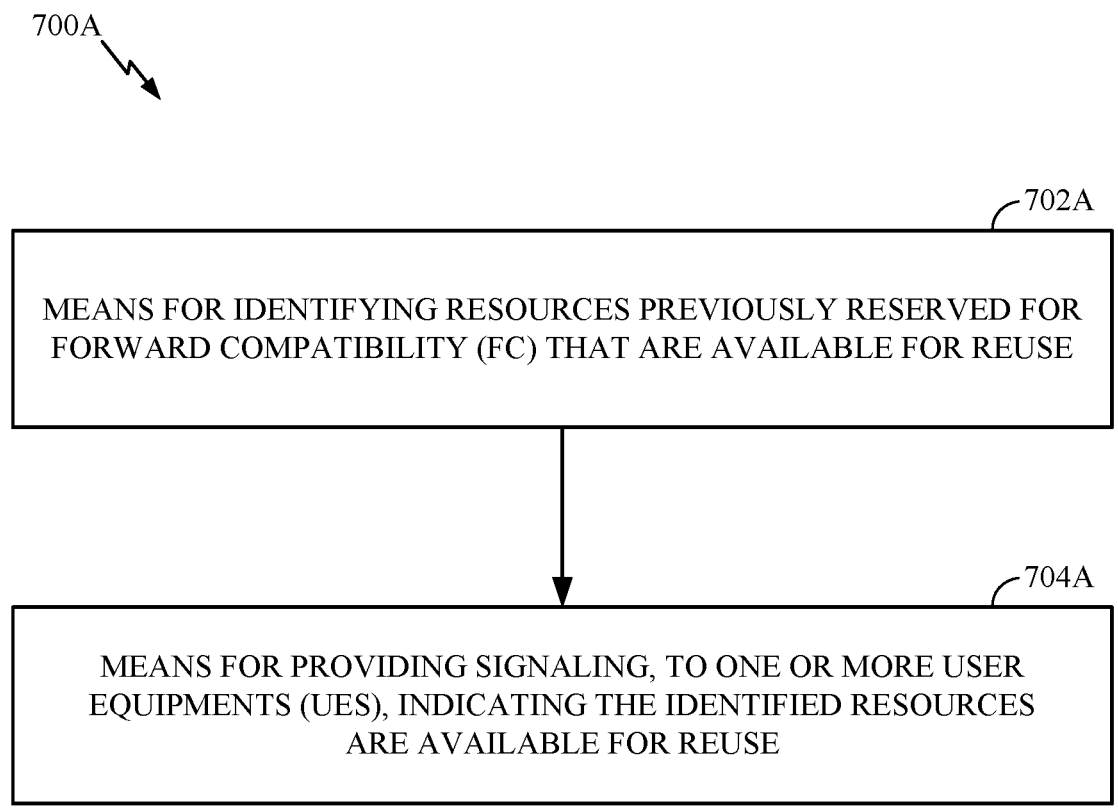
FIG. 7A illustrates example components capable of performing the operations shown in FIG. 7.
Figure 8A:
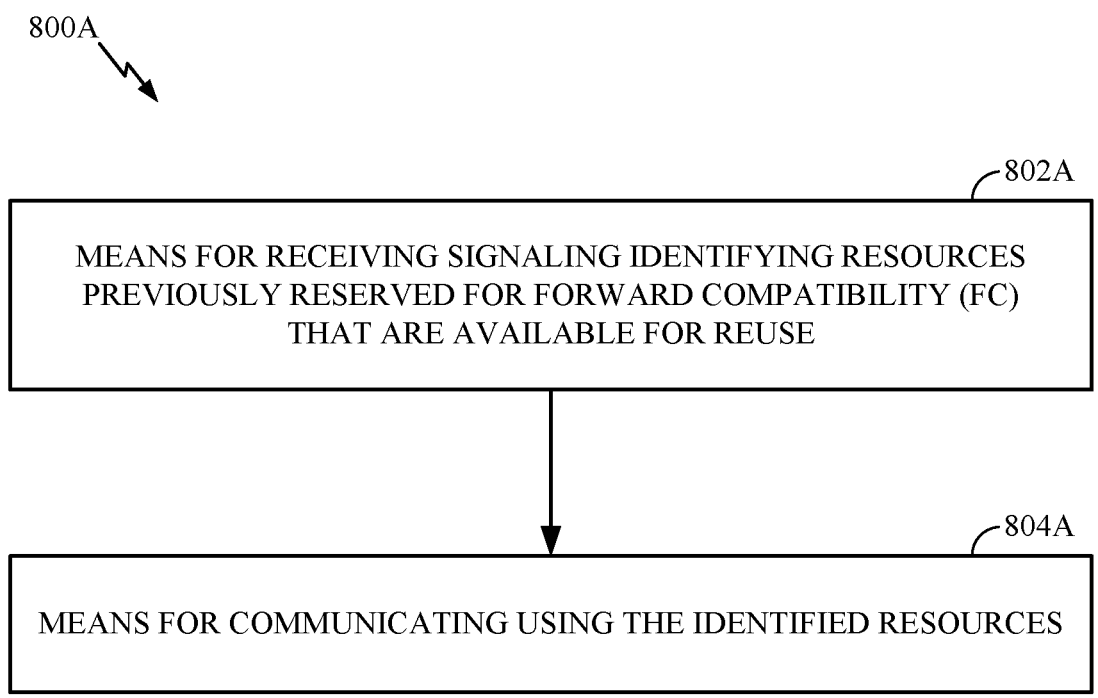
FIG. 8A illustrates example components capable of performing the operations shown in FIG. 8.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 700 illustrated in FIG. 7, and operations 800 illustrated in FIG. 8, correspond to means 700A illustrated in FIG. 7A, means 800A illustrated in FIG. 8A, respectively.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for identifying, means for providing, means for signaling, means for indicating, means for sensing, means for backhaul signaling, and/or means for communicating may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/ or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a network entity, comprising:
    identifying resources reserved for forward compatibility (FC) that are available for reuse by one or more legacy user equipments (UEs); and
    providing signaling, to the one or more legacy UEs, indicating the identified resources are available for reuse.

2. The method of claim 1, wherein the signaling indicates the identified resources are available for a time duration.

3. The method of claim 2, wherein the time duration is triggered by downlink control information (DCI).

4. The method of claim 2, wherein the time duration is a part of a FC resource configuration.

5. The method of claim 1, wherein the signaling indicates the identified resources are available based on at least one of a periodicity or frequency hopping pattern.

6. The method of claim 1, wherein the signaling indicates the identified resources are available based on spatial beamforming.

7. The method of claim 1, wherein the signaling is at least one of cell-specific, UE-specific, or UE-group-specific.

8. The method of claim 1, further comprising:
    signaling multiple FC resource configurations to a UE via radio resource control (RRC) signaling; and
    indicating the identified resources as one of the multiple FC resource configurations.

9. The method of claim 1, wherein the identified resources are identified as available based on one or more triggering events.

10. The method of claim 9, wherein the one or more triggering events comprise a triggering event based on at least one of:
    location of one or more UEs;
    non-overlapping spatial sectors;
    application-specific requirements; or
    capabilities of one or more UEs.

11. The method of claim 9, wherein the one or more triggering events comprise a triggering event based on actual usage of FC resources.

12. The method of claim 11, further comprising determining the actual usage of the FC resources based on at least one of:
    sensing of loading of the FC resources;
    sensing of traffic on the FC resources; or
    backhaul signaling of at least one of loading or traffic on the FC resources.

13. A method for wireless communications by a legacy user equipment (UE), comprising:
    receiving signaling identifying resources reserved for forward compatibility (FC) that are available for reuse by the legacy UE; and
    communicating using the identified resources.

14. The method of claim 13, wherein the signaling indicates the identified resources are available for a time duration.

15. The method of claim 14, wherein:
    the time duration is triggered by downlink control information (DCI), or
    the time duration is a part of a FC resource configuration.

16. The method of claim 13, wherein the signaling indicates the identified resources are available based on at least one of a periodicity or frequency hopping pattern.

17. The method of claim 13, wherein the signaling indicates the identified resources are available based on spatial beamforming.

18. The method of claim 13, wherein the signaling is at least one of cell-specific, UE-specific, or UE-group-specific.

19. The method of claim 13, further comprising receiving signaling of multiple FC resource configurations via radio resource control (RRC) signaling, wherein the signaling indicating the identified resources provides an indication of one of the multiple FC resource configurations.

20. An apparatus for wireless communications by a network entity, comprising:
    at least one processor configured to:
        identify resources reserved for forward compatibility (FC) that are available for reuse by one or more legacy user equipments (UEs); and
        provide signaling, to the one or more legacy UEs, indicating the identified resources are available for reuse; and
    a memory coupled with the at least one processor.

21. The apparatus of claim 20, wherein the signaling indicates the identified resources are available for a time duration.

22. The apparatus of claim 21, wherein:
    the time duration is triggered by downlink control information (DCI); or
    the time duration is a part of a FC resource configuration.

23. The apparatus of claim 20, wherein the signaling indicates the identified resources are available based on at least one of a periodicity or a frequency hopping pattern.

24. The apparatus of claim 20, wherein the signaling is at least one of cell-specific, UE-specific, or UE-group-specific.

25. An apparatus for wireless communications by a legacy user equipment (UE), comprising:
    at least one processor configured to:
        receive signaling identifying resources reserved for forward compatibility (FC) that are available for reuse by the legacy UE; and
        communicate using the identified resources; and
    a memory coupled with the at least one processor.

26. The apparatus of claim 25, wherein the signaling indicates the identified resources are available for a time duration.

27. The apparatus of claim 26, wherein:
 the time duration is triggered by downlink control information (DCI); or
 the time duration is a part of a FC resource configuration.

28. The apparatus of claim 25, wherein the signaling indicates the identified resources are available based on at least one of a periodicity or frequency hopping pattern.

29. The apparatus of claim 25, wherein the signaling is at least one of cell-specific, UE-specific, or UE-group-specific.

* * * * *